Sept. 8, 1942.   C. G. SPENCER   2,295,187
TRUNK HUNTING CIRCUIT
Filed Sept. 24, 1941
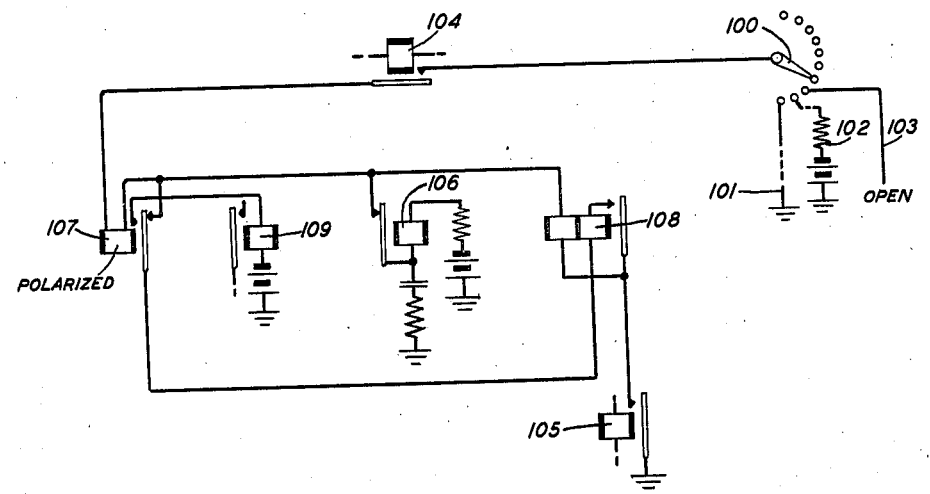
INVENTOR
C. G. SPENCER
BY P. C. Smith
ATTORNEY Patented Sept. 8, 1942

2,295,187

UNITED STATES PATENT OFFICE 2,295,187

TRUNK HUNTING CIRCUIT

Charles G. Spencer, East Orange, N. J., assignor to Bell Telephone Laboratories, Incorporated, New York, N. Y., a corporation of New York Application September 24, 1941, Serial No. 412,059

6 Claims. (Cl. 179—18)

This invention relates to telephone systems and has for its object to increase the speed of operation of hunting switches.

Heretofore, in general, where a rotary switch has been used to hunt for one of a number of idle circuits, one of two arrangements has been used. Busy circuits have been marked by ground, with the stepping magnet operated from that ground, or idle circuits have been marked by battery and a separate test relay has been employed. In the former case the accidental opening of a test circuit would permit the false selection of a busy circuit while in the latter case the switch must be operated at a slower speed to allow time for the test relay to operate.

In accordance with the present invention an arrangement for hunting for idle trunks or similar circuits has been provided in which a polarized test relay is included in the self-interrupting circuit of the stepping magnet in such a way that the stepping magnet is operated from busy trunks and the polarized test relay is operated from idle trunks, together with means under the control of the test relay to close a supplementary circuit for the stepping magnet when the primary circuit is not closed by a trunk.

The invention will be more clearly understood from a consideration of the following description in connection with the drawing which shows in simple form a hunting control circuit embodying the invention. This arrangement would find use in a call distributing system like that shown in U. S. Patent 1,816,634 to W. W. Carpenter et al., July 28, 1931. A circuit embodying a similar switch operating circuit is included in the application of O. Cesareo, Serial No. 412,073, filed September 24, 1941.

Wiper 100 is the test wiper of a switch having access to a plurality of outgoing circuits, for example, operators' positions. Busy positions are marked by ground as indicated at 101, while idle positions are marked by battery through a resistance, such as resistance 102. Therefore, under normal conditions each terminal to which test wiper 100 has access is marked definitely by either battery or ground.

However, it is possible that, due to any one of a number of unstandard conditions, the circuit attached to a terminal of wiper 100, for example, conductor 103, may be opened.

During the preparation of the circuit for hunting, relay 105 is operated, followed by relay 104. With relay 104 operated a circuit is closed from battery through the winding of stepping magnet 106 and its back contact, winding of polarized test relay 107, contact of relay 104, to test wiper 100. At the same time a circuit is closed from ground over the contact of relay 105, high resistance left winding of relay 108 to the winding of relay 107 in parallel with magnet 106. Magnet 106 cannot operate in series with the high resistance left winding of relay 108.

If wiper 100 is engaging the test terminal of an idle position, battery through resistance 102 completes a circuit for polarized relay 107 in series with the high resistance winding of relay 108. Relay 107, being polarized to be responsive to the current now flowing, operates quickly. Relay 108 also operates but more slowly, and completes a circuit from ground over the contact of relay 105, contact and low resistance right winding of relay 108, front contact of relay 107 to the winding of relay 109 and battery. Relay 109 controls the further functions of the trunk circuit.

If wiper 100 is engaging a terminal marked by busy ground, stepping magnet 106 operates in series with test relay 107 and advances the wiper in search of an idle position. This ground over wiper 100 is in shunt of the winding of relay 108 and that relay cannot operate. The current flowing through polarized relay 107 is also ineffective to operate relay 107, being in the wrong direction, and that relay remains inert until an idle position is found, at which time it functions as above described.

If, while hunting for an idle position, wiper 100 encounters a terminal having an open circuit as at 103, neither relay 107 nor magnet 106 can operate. Under this condition a circuit exists from ground at the contact of relay 105, left winding of relay 108, back contact and winding of magnet 106 to battery. Magnet 106 cannot operate in series with the high resistance winding of relay 108, as above mentioned, but relay 108 operates, connecting its low resistance winding in parallel with its high resistance winding over contacts of relays 108 and 107.

Magnet 106 is able to operate in series with this lower resistance and steps test wiper 100 to the next terminal. If this terminal is idle relay 107 operates, opening the low resistance circuit to prevent magnet 106 from reoperating. If, on the other hand, this next terminal is busy, the ground connected thereto operates magnet 106 and also shunts the windings of relay 108 causing that relay to release. If, further, this terminal is also connected to an open circuit, relay 108 reoperates and magnet 106 also reoperates to again advance test wiper 100.

What is claimed is:

1. In a telephone system, a switch, a magnet for causing said switch to advance in search of an idle trunk, a polarized relay, a test wiper for said switch, a first operating circuit for said magnet including said polarized relay and said test wiper in series, means in busy trunks for operating said magnet over said first circuit, means in idle trunks for operating said relay, a second circuit for said magnet and means to closed said second circuit when said test wiper rests on a trunk which does not complete said first circuit.

2. In a telephone system, a switch, a magnet for causing said switch to advance in search of an idle trunk, a polarized relay, a test wiper for said switch, an operating circuit for said magnet including said polarized relay and said test wiper in series, means in busy trunks for operating said magnet over said circuit, means in idle trunks for operating said relay, a second circuit for said magnet, means to close said second circuit when said test wiper rests on a trunk which does not complete said first circuit and means under the control of said polarized relay for preventing the operation of said magnet in said second circuit.

3. In a telephone system, a switch, a magnet for causing said switch to advance in search of an idle trunk, a polarized relay, a test wiper for said switch, an operating circuit for said magnet including said polarized relay and said test wiper in series, means in busy trunks for operating said magnet over said circuit, means in idle trunks for operating said relay, an auxiliary circuit for said magnet, and means under the control of said polarized relay to render said auxiliary circuit ineffective.

4. In a telephone system, a switch, a magnet for causing said switch to advance in search of an idle trunk, a polarized relay, a test wiper for said switch, an operating circuit for said magnet including said polarized relay and said test wiper in series, means in busy trunks for operating said magnet over said circuit, means in idle trunks for operating said relay, a high resistance, normally ineffective, auxiliary circuit for said magnet, and means effective when said test wiper rests on a trunk which does not complete said operating circuit, to reduce the resistance in said auxiliary circuit to permit said magnet to operate.

5. In a telephone system, a switch, a magnet for causing said switch to advance in search of an idle trunk, a polarized relay, a test wiper for said switch, an operating circuit for said magnet including said polarized relay and said test wiper in series, means in busy trunks for operating said magnet over said circuit, means in idle trunks for operating said relay, a second circuit for said magnet exclusive of said polarized relay, means to close said second circuit when said test wiper rests on a trunk which does not complete said first circuit and means under the control of said polarized relay for preventing the closure of said second circuit.

6. In a telephone system, a switch, a magnet for causing said switch to advance in search of an idle trunk, a polarized relay, a test wiper for said switch, an operating circuit for said magnet including said polarized relay and said test wiper in series, means in busy trunks for operating said magnet over said circuit, means in idle trunks for operating said polarized relay, an auxiliary relay having a high resistance winding and a low resistance winding, a secondary circuit for said magnet including said high resistance winding, said auxiliary relay when operated connecting its low resistance winding in parallel with its high resistance winding to provide a low resistance circuit in which said magnet can operate, means controlled by said magnet to prevent the operation of said auxiliary relay and means controlled by said polarized relay to prevent the operation of said auxiliary relay from being effective to close said low resistance circuit.

CHARLES G. SPENCER.